United States Patent

Bronner

[11] Patent Number: 6,030,651
[45] Date of Patent: Feb. 29, 2000

[54] FILLED PASTA ROLLED IN THE SHAPE OF A COIL

[75] Inventor: Peter L. Bronner, Minusio, Switzerland

[73] Assignee: Speedy Gastronomica SA, Minusio, Switzerland

[21] Appl. No.: 09/043,460

[22] PCT Filed: Sep. 10, 1996

[86] PCT No.: PCT/DE96/01702

§ 371 Date: Jun. 22, 1998

§ 102(e) Date: Jun. 22, 1998

[87] PCT Pub. No.: WO97/10728

PCT Pub. Date: Mar. 27, 1997

[30] Foreign Application Priority Data

Sep. 20, 1995 [DE] Germany .......................... 195 34 973

[51] Int. Cl.[7] .................................................. A23L 1/16
[52] U.S. Cl. .............................. 426/91; 426/94; 426/134; 426/138; 426/283; 426/284; 426/297; 426/557
[58] Field of Search ................................ 426/91, 94, 138, 426/143, 134, 282, 283, 284, 297, 115, 128, 557, 500, 501

[56] References Cited

U.S. PATENT DOCUMENTS

| | | |
|---|---|---|
| 2,352,617 | 7/1944 | Cohen et al. . |
| 2,726,156 | 12/1955 | Armstrong ............................... 426/128 |
| 2,745,753 | 5/1956 | Ayres ....................................... 426/128 |
| 3,051,583 | 8/1962 | Tindall ..................................... 426/115 |
| 3,357,835 | 12/1967 | Molitorisz ................................ 426/143 |
| 3,532,510 | 10/1970 | Zimmerman .............................. 426/94 |
| 3,615,678 | 10/1971 | Tangel ..................................... 426/297 |
| 3,723,129 | 3/1973 | Bushmeyer et al. ..................... 426/143 |
| 3,796,812 | 3/1974 | Baensch .................................. 426/115 |
| 3,798,343 | 3/1974 | Vitale ....................................... 426/297 |
| 3,804,956 | 4/1974 | Bongiovanni ............................ 426/134 |
| 4,399,156 | 8/1983 | Bernal ...................................... 426/91 |
| 4,400,404 | 8/1983 | Persi ......................................... 426/94 |
| 4,597,976 | 7/1986 | Doster et al. . |
| 4,882,175 | 11/1989 | Ream et al. . |
| 4,898,744 | 2/1990 | Liggett et al. ............................ 426/94 |
| 4,938,975 | 7/1990 | Waller ...................................... 426/94 |
| 4,961,949 | 10/1990 | Barnes et al. ............................ 426/297 |
| 4,966,781 | 10/1990 | Artzer ....................................... 426/91 |
| 5,112,631 | 5/1992 | Nakamura ................................ 426/297 |
| 5,133,980 | 7/1992 | Ream et al. .............................. 426/115 |
| 5,137,737 | 8/1992 | Kaiser et al. ............................. 426/94 |
| 5,487,905 | 1/1996 | Askman et al. .......................... 426/283 |

FOREIGN PATENT DOCUMENTS

| | | |
|---|---|---|
| 0486736 | 5/1992 | European Pat. Off. . |
| 2718925 | 10/1995 | France . |
| 4219570 | 6/1993 | Germany . |
| 4408724 | 9/1995 | Germany . |
| 29515099 U | 12/1995 | Germany . |
| 2-92232 | 4/1990 | Japan ....................................... 426/91 |

*Primary Examiner*—Steven Weinstein
*Attorney, Agent, or Firm*—Antton & Associates P.C.

[57] ABSTRACT

A pasta is formed from a tube of pasta that is cooked, filled with sauce, sealed on one end, left open on the other end and rolled into the shape of a coil. The pasta is suitable for being eaten while on the move.

5 Claims, 1 Drawing Sheet

FILLED PASTA ROLLED IN THE SHAPE OF A COIL

BACKGROUND AND SUMMARY OF THE INVENTION

The present invention concerns a type of pasta in the shape of a long tube, which is cooked and rolled like a coil.

German Patent No. 42 19 570 shows how to develop pasta in form of a tube, with holes arranged throughout its complete length and a total surface of at least the same size as the front face. Long bits of vegetables can be inserted into a tube for preparing a dish using this type of raw pasta.

German Patent No. 44 08 724 A1 suggests arranging spaghetti in form of a coil or a wreath instead of the common long shape and creating connections between some of the windings. During cooking, these connections come undone and the pasta regains its original long shape.

U.S. Pat. No. 4,259,051 shows filling the pasta tubes with ketchup, jelly or similar substances by coextrusion. Such filled pasta tubes can then be cut into pieces and the ends sealed.

These known types of pasta are not suitable or even designed for to be eaten by someone on the move. However, it is an objective of the present invention to provide a type of pasta that is well suited to being consumed while on the move. The present invention achieves this objective by providing a tube of pasta that is sealed on one end and open and filled with sauce on the other end.

The present invention can use a coil shape to ease the transport of the pasta. The present invention has the advantage that it can be eaten while being held in one hand. The pasta product of the present invention can be used, for example, as a snack-product with the aid of a stick. The open end of the pasta permits the consumer to easily identify the filling.

The foregoing objectives, features and advantages of the invention, and others, too, are explained below with the aid of the drawings.

DETAILED DESCRIPTION

Figure 1:
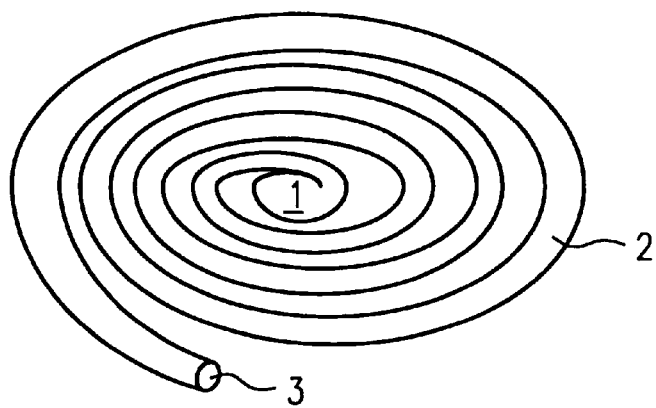
FIG. 1 pasta in coil shape from a perspective view.
Figure 2:
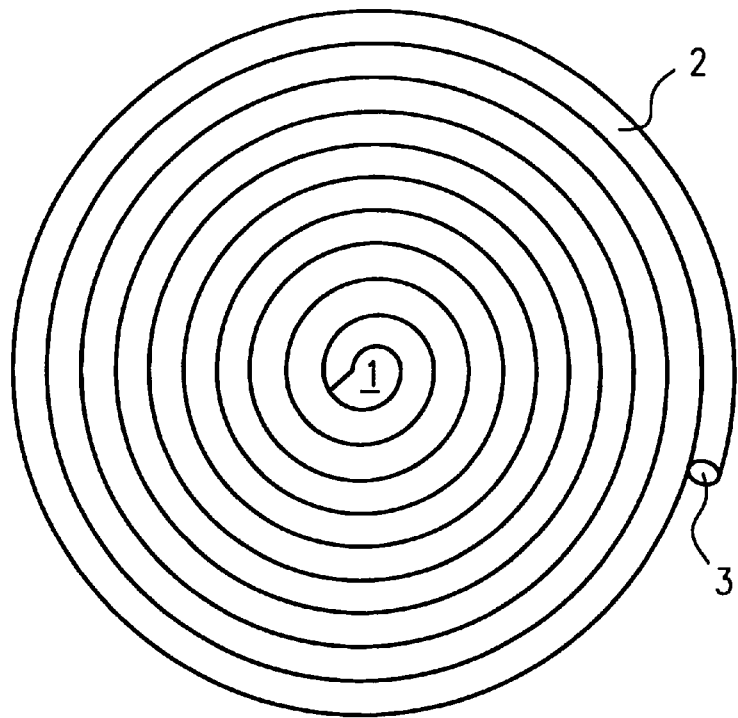
FIG. 2 pasta in coil-shape seen from above.

FIG. 1 shows a perspective view of pasta in the shape of a long tube 2, rolled like a coil. The numeral 1 indicates the inside end of the tube that is sealed. The other, outer end 3 is left open. The tube 2 contains a sauce that can be filled in any of several ways that are known in the art. It is also possible to fill the sauce into the tube by pressing after cooking.

The pasta functions as transportable container for the sauce. This operation is to be contrasted with the more conventional situation in which the sauce is poured over the pasta. Nevertheless, the consumer can easily recognize the type of sauce from the end of the pasta tube.

The outer diameter of the pasta in the coil-shape can be about 10 mm to 20 mm. further length of the unrolled coil can be of about 80 mm to 100 cm. The opening of the tube 3 can be laid out with 5 mm to 15 mm.

The pasta-coil can be packed in a flat paper bag so as to be held and consumed comfortably. Handling can be further simplified using a wooden stick or equivalent structure that can be stuck in the middle of the coil to function as a handle.

The pasta can be made of flour or semolina, particularly wheat semolina, like is used for spaghetti and Italian noodles. This pasta dough is hard and dry in its raw condition and is made eatable by cooking it in clear, possibly slightly salted water. Thanks to the sauce filling of this pasta coil, it is easily consumable as pasta with sauce without any further aid—like i.e. cutlery—also while on the move, and thus is especially suitable for use in the fast-food sector. The pasta can be eaten by biting off one mouthful at a time from the outside. This technique allows for avoiding stains and smears. Such a filled noodle in coil-form can function as a small snack and weighs about 80 g to 100 g. The filling can use any of several known sauces. However, it is thought best to use sauces that use ingredients that are grainy, and it is also desirable that the overall consistency of the sauce not have a too liquid consistency. The exact choice of suitable sauces is within the level of one of ordinary skill in the art.

The principles, preferred embodiments and modes of operation of the present invention have been set forth in the foregoing specification. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously envisioned. Numerous variations and changes can be made to the foregoing ilustrative embodiments without departing from the scope and spirit of the present invention as set forth in the appended claims.

I claim:

1. A coiled, filled pasta, comprising:
    a long tube of pasta material having first and second ends, the pasta material having been cooked and said tube having been rolled into a coil to form a coiled pasta tube;
    said first end of the coiled pasta tube being sealed;
    said second end of the coiled pasta tube being open; and
    said coiled pasta tube containing a sauce filling.

2. A pasta as claimed in claim 1, wherein the outer diameter of the pasta in the coiled shape is about 10 mm to 20 mm and the length of the unrolled coil is about 80 to 100 cm.

3. A pasta as claimed in claim 2, further comprising a handle that is affixed to the middle of the pasta coil.

4. A pasta as claimed in claim 1, further comprising a handle that is affixed to the middle of the pasta coil.

5. A pasta as claimed in claim 1, further wherein the coiled pasta tube is round.

* * * * *